United States Patent [19]

Tanaka

[11] Patent Number: 5,654,837

[45] Date of Patent: Aug. 5, 1997

[54] ZOOM LENS BARREL

[75] Inventor: Hitoshi Tanaka, Tokyo, Japan

[73] Assignee: Asahi Kogaku Kogyo Kabushiki Kaisha, Tokyo, Japan

[21] Appl. No.: 634,261

[22] Filed: Apr. 18, 1996

[30] Foreign Application Priority Data

Apr. 25, 1995 [JP] Japan ................... 7-100986

[51] Int. Cl.$^6$ ................... G02B 7/02
[52] U.S. Cl. ................... 359/825; 359/694; 359/700; 396/87; 396/462
[58] Field of Search ................... 359/825, 694, 359/700; 396/87, 89, 462, 529, 542

[56] References Cited

U.S. PATENT DOCUMENTS

| 5,051,764 | 9/1991 | Nomura | 396/462 |
| 5,270,868 | 12/1993 | Nomura | 359/700 |
| 5,327,184 | 7/1994 | Nomura et al. | 396/87 |
| 5,349,475 | 9/1994 | Nomura et al. | 359/694 |

*Primary Examiner*—Loha Ben
*Attorney, Agent, or Firm*—Greenblum & Bernstein, P.L.C.

[57] ABSTRACT

A zoom lens barrel of a camera has an outer ring and an inner ring located inside the outer ring. The inner ring moves relative to the outer ring during zooming. A brush holder having zoom brushes at both ends is supported by one of the inner and outer rings. The zoom brushes are made of an elastic conductive material. Zoom brushes provided at one end of the brush holder come into slidable contact with a zoom code plate, which is supported by the one of the inner and outer rings that does not support the brush holder. Zoom brushes, provided at the other end of the brush holder, contact brush contacting terminals of a flexible printed circuit board. A contact reaction force is created between the zoom brushes, the zoom code plate and the flexible printed circuit board, which provides bias force to press the brush holder against one of the inner or outer rings.

18 Claims, 5 Drawing Sheets

1

ZOOM LENS BARREL

BACKGROUND OF THE INVENTION

1. Field of the Invention

The present invention relates to a zoom lens barrel having a device for detecting a variation in focal length during zooming. In particular, the present invention relates to an apparatus for determining a variation in focal length which includes a zoom code plate and a zoom brush contacted therewith.

2. Description of Related Art

In conventional zoom lens barrels, such as those used in still cameras for example, devices equipped with a zoom code plate and a zoom brush, supported respectively by an outer ring and by an inner ring which move relatively during zooming, are often used as a means for detecting a focal length during zooming. In such a device, when the outer ring and the inner ring move relatively during zooming, the zoom brush is slid while contacting a conductive pattern formed on the zoom code plate, and a signal corresponding to a current focal length is outputted to a camera operation control circuit. Based on this signal, the camera operation control circuit inputs data, from a data table which may be prepared for any variable information, corresponding to the focal length at that time.

In the prior art, zoom lens barrels having such a focal length detecting device have been assembled in a manner such that the zoom brush is fixed to the zoom brush supporting part on the inner ring by screws, adhesives or the like. This results in a time consuming assembly operation, poor production efficiency, and additionally once the zoom brush has been fixed, it is very difficult to detach it.

SUMMARY OF THE INVENTION

The primary object of the present invention is to provide a zoom lens barrel in which it is easy to assemble or detach the zoom brush to or from the outer or the inner ring, which results in a shortened assembly time, and therefore improving production efficiency.

To achieve the objects mentioned above, according to an aspect of the present invention, there is provided a zoom lens barrel which comprises an outer ring and an inner ring located inside the outer ring, the inner ring moving relative to the outer ring during zooming. A brush holder having zoom brushes at both ends, is supported by one of the inner or outer rings. The zoom brushes being made of an elastic conductive material. Zoom brushes provided at one end of the brush holder are in slidable contact with a zoom code plate. The zoom code plate being supported by the inner or outer ring, which does not support the brush holder. A flexible printed circuit board is provided having brush contacting terminals which come into contact with the zoom brushes provided at the other end of the brush holder. This contact causes a contacting reaction force, which functions as a force to pressingly support the brush holder against one of the inner or outer rings.

Preferably, a slide guide and a stopper are provided on the same ring which supports the brush holder. During an assembly operation, the brush holder is slid along the slide guide until reaching the stopper, which functions as a sliding terminal position of the brush holder. When the brush holder is in contact with the stopper, a reaction force, caused between the zoom brushes of the one end of the zoom brush and the zoom code plate, functions as a force to pressingly support the brush holder against the stopper.

It is preferred that the brush holder and the zoom code plate are respectively supported by the inner ring and by the outer ring.

The inner ring preferably comprises a rectangular space into which the brush holder is fit in a prearranged mounting position, wherein longitudinal sides of the rectangular space are defined by a pair of legs formed parallel to the direction of movement of the brush holder. The slide guide and the stopper are provided in each of the pair of legs. A control barrier is provided between the pair of legs, at a position away from the brush contacting terminals, wherein a part of the zoom brushes at one end of the brush holder contact a bottom of the control barrier when the brush holder is in the prearranged position. When the part of the zoom brushes at one end of the brush holder contacts the bottom of the control barrier, a reaction force is caused, which functions as a force to pressingly support the brush holder against the stopper.

Preferably, the slide guide comprises a front slide guide and a rear slide guide, the stopper comprises a front stopper and a rear stopper. The front slide guide and the front stopper prevent a downward movement of the brush holder, while the rear slide guide and the rear stopper prevent an upward movement of the brush holder.

When the brush holder is in contact with the rear stopper, a reaction force, caused between the zoom brushes of the one end of the zoom brush and the zoom code plate, functions as a force to pressingly support the brush holder against the rear stopper.

During the assembly operation, the brush holder is slid along the rear slide guide in a direction towards the brush contacting terminals until a prearranged mounting position is reached, and upon reaching this position the brush holder contacts the rear stopper.

Preferably, the brush holder further comprises a pair of contacting portions, which contact the front slide guide during assembly.

The rear slide guide is preferably formed parallel to an optical axis of the zoom lens barrel, and the rear stopper is formed perpendicular to the rear slide guide.

The flexible printed circuit board can be provided on the same ring which supports the brush holder.

According to another aspect of the present invention a zoom lens barrel is provided comprising outer and inner rings, the inner ring being located inside and moving relative to the outer ring during zooming. A brush holder having zoom brushes at both ends is supported by one of the inner or outer rings. The zoom brushes being made of an elastic conductive material. Zoom brushes at one end of the brush holder are in slidable contact with a zoom code plate. The zoom code plate is supported on the outer or inner ring which does not support the brush holder. A flexible printed circuit board, to be electrically connected to the zoom brushes, is provided on the same ring that supports the brush holder. Brush contacting terminals, of the flexible printed circuit board, being in contact with zoom brushes on the other end of the brush holder.

The present disclosure relates to subject matter contained in Japanese Patent Application No. 7-100986 (filed on Apr. 25, 1995) which is expressly incorporated herein by reference in its entirety.

BRIEF DESCRIPTION OF THE DRAWINGS

The above and other objects, features, and advantages of the present invention will be described in greater detail with respect to the accompanying drawings, in which like reference numerals represent like elements, and wherein.

DESCRIPTION OF THE PREFERRED EMBODIMENT

The present invention will now be described below in greater detail, with specific reference to the accompanying drawings. Firstly, an overall description of a zoom lens barrel of a still camera according to an aspect of the present invention will be discussed with reference to FIG. 1.

Figure 1:
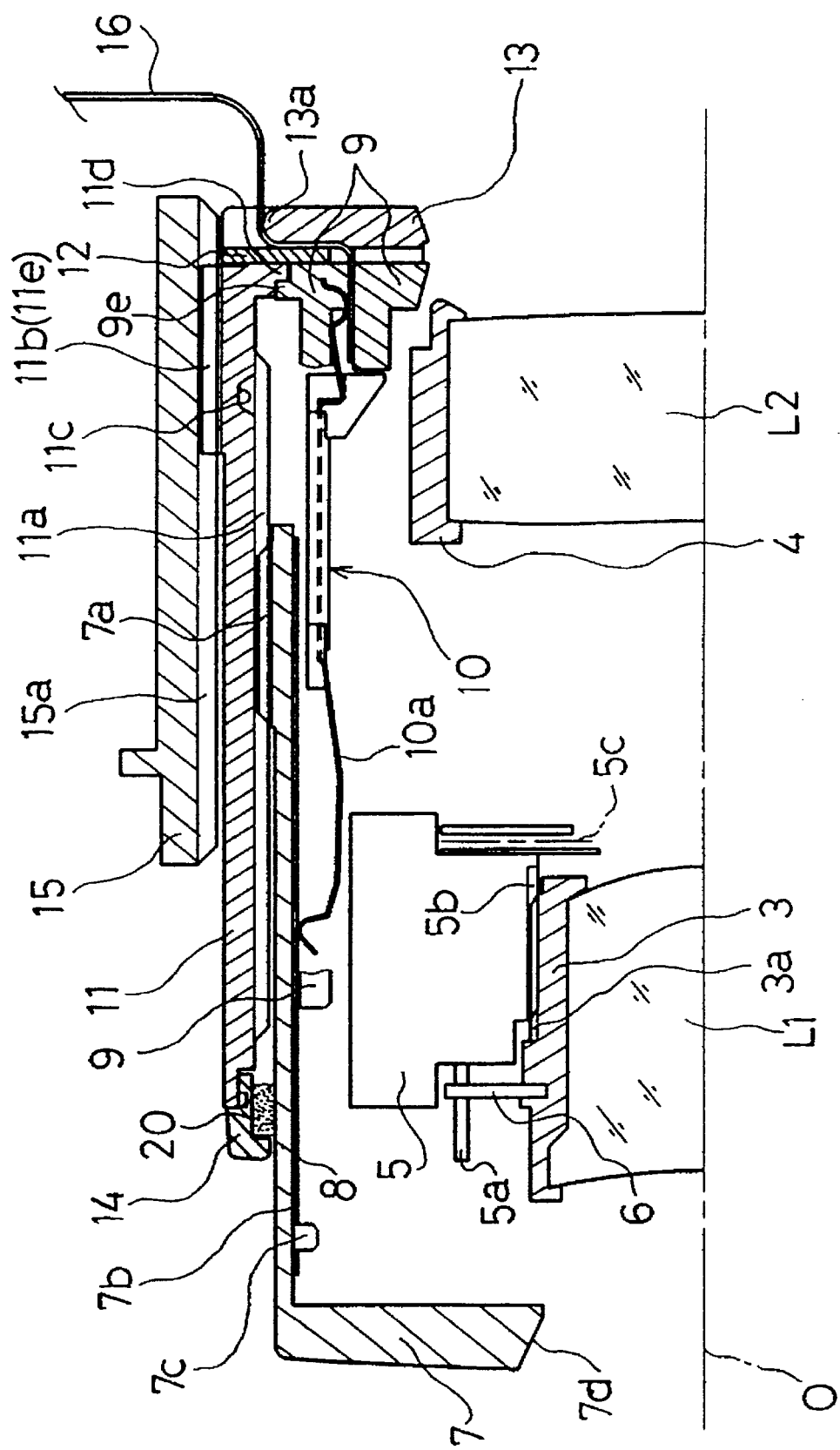
FIG. 1 is a longitudinal sectional view of a zoom lens barrel having a zoom brush mounted therein according to an aspect of the present invention.

FIG. 1 shows a fixed lens barrel 15, fixed to a camera body (not shown), having a female multiple thread 15a formed on an inner periphery thereon. In the inner periphery of the fixed lens barrel 15, a cam ring 11 is positioned in a manner such that at a rear end of an outer periphery thereof, a male multiple thread 11b engages with the female multiple thread 15a. A female multiple thread 11a is formed throughout approximately the whole of an inner periphery of the cam ring 11, and an inner cam groove 11c is also formed, on the inner periphery of the cam ring 11, having a different helicoid angle and depth from the female multiple thread 11a. At the rear end of the cam ring 11 and in parallel to the male multiple thread 11b, a plurality of threads of a peripheral gear (e.g., three) 11e are formed, laid in parallel with each other, i.e., each thread of the peripheral gear 11e is formed between the male multiple thread 11b. The peripheral gear 11e is comprised of a spur gear having teeth parallel to an axis of the cam ring 11.

Reference numeral 14 corresponds to a cap fitted on the front end of the cam ring 11. A light intercepting ring 20 is also provided towards the front end of the cam ring 11, which intercepts light between the cam ring 11 and a front lens group ring 7. A photographing optical system comprising a front lens group L1 and a rear lens group L2, is provided along an optical axis O.

The fixed lens barrel 15 has a rectangular notch on a side thereon (not shown), whose sides are longer in the direction of the optical axis. A pinion (not shown) is positioned in the notch and is engaged with the peripheral gear 11e. The pinion has an axial length long enough so as to always be engaged with the threads of the peripheral gear 11e, throughout the movement of the cam ring 11. The pinion is positioned at a fixed position in the notch, and is rotated by a driving motor (not shown).

Figure 7:
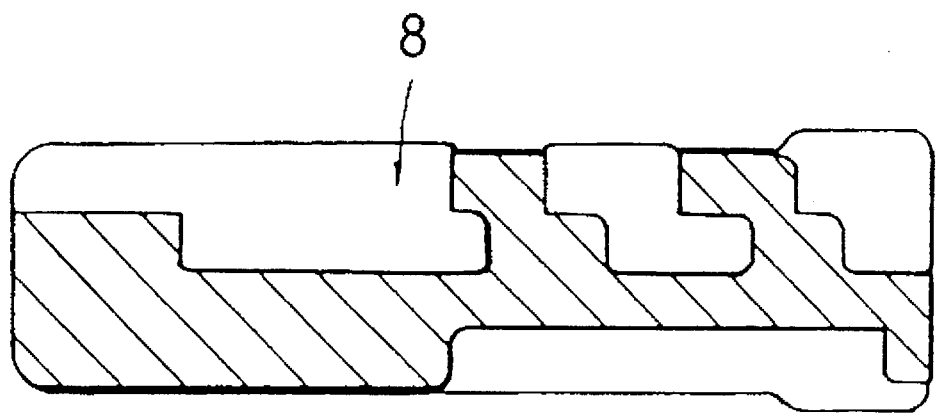
FIG. 7 is a front elevational view of a zoom code plate which is in slidable contact with the zoom brush.

In the inner periphery of the cam ring 11, the front lens group ring 7 is positioned in a manner such that a male multiple thread 7a, formed at a rear end of an outer periphery thereof, is engaged with the female multiple thread 11a. On an inner periphery of the front lens group ring 7 there are provided a code plate adhering part 7b for adhering a zoom code plate 8 thereon, an index projection 7c, and a lens opening 7d formed at a front end thereof. The zoom code plate 8 has a conductive pattern as illustrated in FIG. 7, and during zooming moves forwardly and rearwardly in the optical axis direction together with the front lens group ring 7, so that a relative position to a zoom brush 10 is varied.

It should be noted that the zoom code plate 8 and the zoom brush 10 are in slidable contact and based upon this, contact focal length detecting information, corresponding to a current focal length, is outputted to a camera operation control circuit (not shown), and based on this information, any data, from a data table prepared for any variable information, corresponding to the current focal length is inputted to the camera operation control circuit.

A linear guide ring 9 is fitted in the inner periphery of the front lens group ring 7. A relative rotation of the linear guide ring 9, to the camera body, is controlled by an unillustrated control means. In addition to this relative rotation, the linear guide ring 9 is permitted to move along the optical axis of the photographing optical system. The linear guide ring 9 guides the front lens group L1 and the rear lens group L2 linearly in the optical axis direction, and at the same time supports the zoom brush 10 (see FIG. 3). Towards a rear end of the linear guide ring 9, a presser plate 12 and a cover material 13, having respective openings corresponding to an aperture of the camera body, are fixed.

The linear guide ring 9 has an outer flange 9e at the rear end thereof, which projects in the radial direction. The outer flange 9e maintains the condition of being capable of rotating relatively to the cam ring 11, due to slidable contact with an inner flange 11d, formed on the rear end of the inner periphery of the cam ring 11, in a concave part between the outer flange 9e and the presser plate 12.

Further, an AF/AE unit 5, having a circular form, is fixed to the front lens group ring 7 by an unillustrated means. A female multiple thread 3a, provided on an outer periphery of a front lens group frame 3, which supports the front lens group L1, is engaged with a female multiple thread 5b provided on an inner periphery of the AF/AE unit 5. A driving pin 5a, positioned at a front end of the AF/AE unit 5, contacts a driven pin 6 which is fixed on the front lens group frame 3. As is generally known, when the driving pin 5a is rotated by an angle corresponding to a focal length detecting signal outputted from a focal length detecting apparatus (not shown), the rotation is transmitted to the front lens group frame 3 via the driven pin 6, and focusing is performed in a manner such that the front lens group frame 3 (i.e., the front lens group L1) moves rotatively in the optical axis direction. The AF/AE unit 5 additionally opens or shuts a shutter blade 5c according to a luminance signal of an object to be photographed.

In the inner periphery of the linear guide ring 9, a rear lens group frame 4, which supports the rear lens group L2, is positioned. The rear lens group frame 4 contacts a cam pin (not shown), which projects radially, to be in slidable contact with the inner cam groove 11c. The rear lens group frame 4 and the AF/AE unit 5 are respectively linearly guided by a linear guide surface (not shown) formed in the linear guide ring 9. Thus, when the cam ring 11 rotates, the front lens group ring 7 follows the multiple threads 7a and 11a, and the rear lens group frame 4 follows the inner cam groove 11c, so that the front lens group ring 7 and the rear lens group frame 4 move separately in the optical axis direction.

The following description will be directed towards a supporting construction of the zoom brush 10, which is one of the most important features of the present invention.

Figure 2:
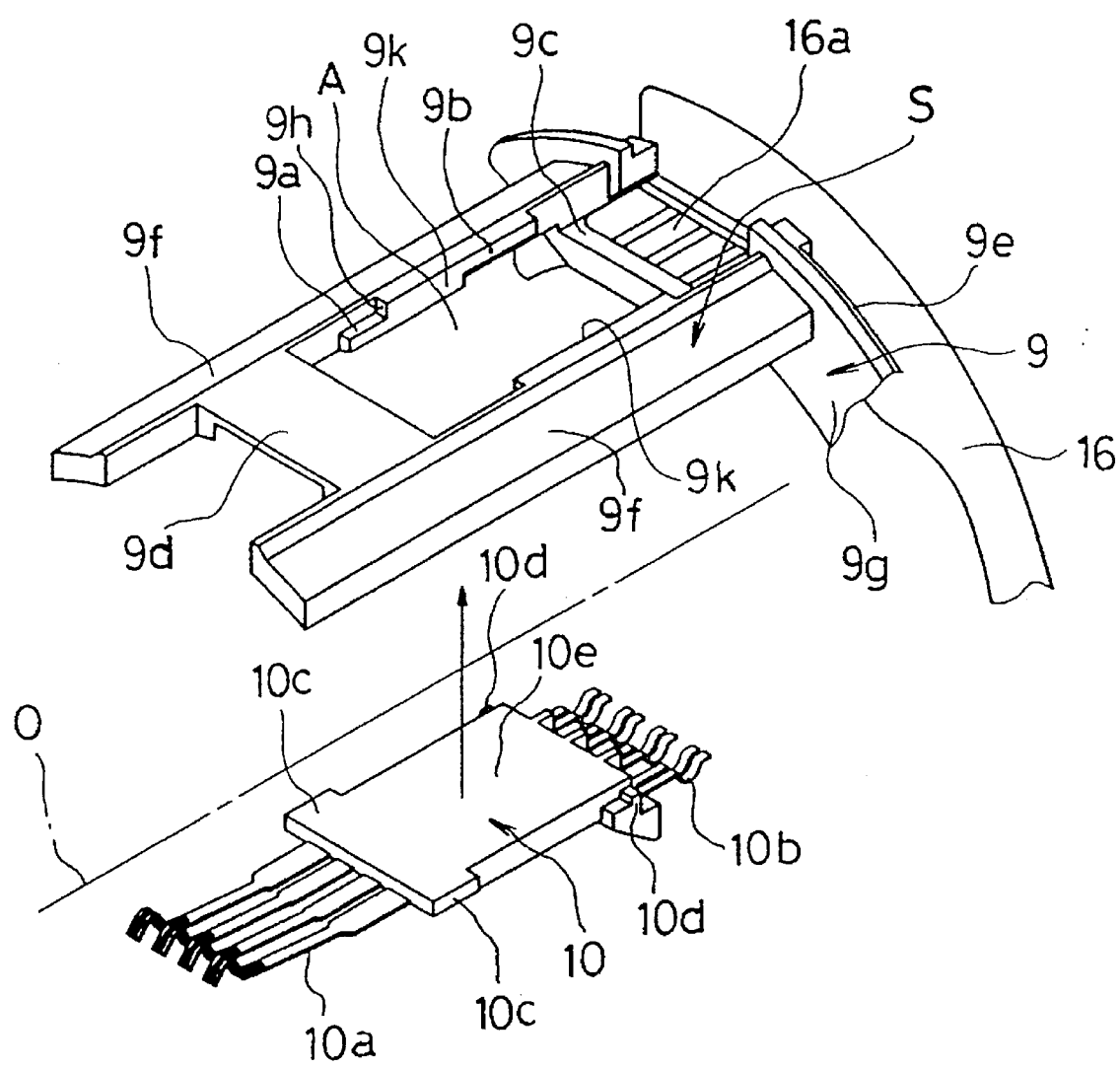
FIG. 2 is a schematic perspective view showing a state before a zoom brush is mounted to a linear guide ring.
Figure 3:
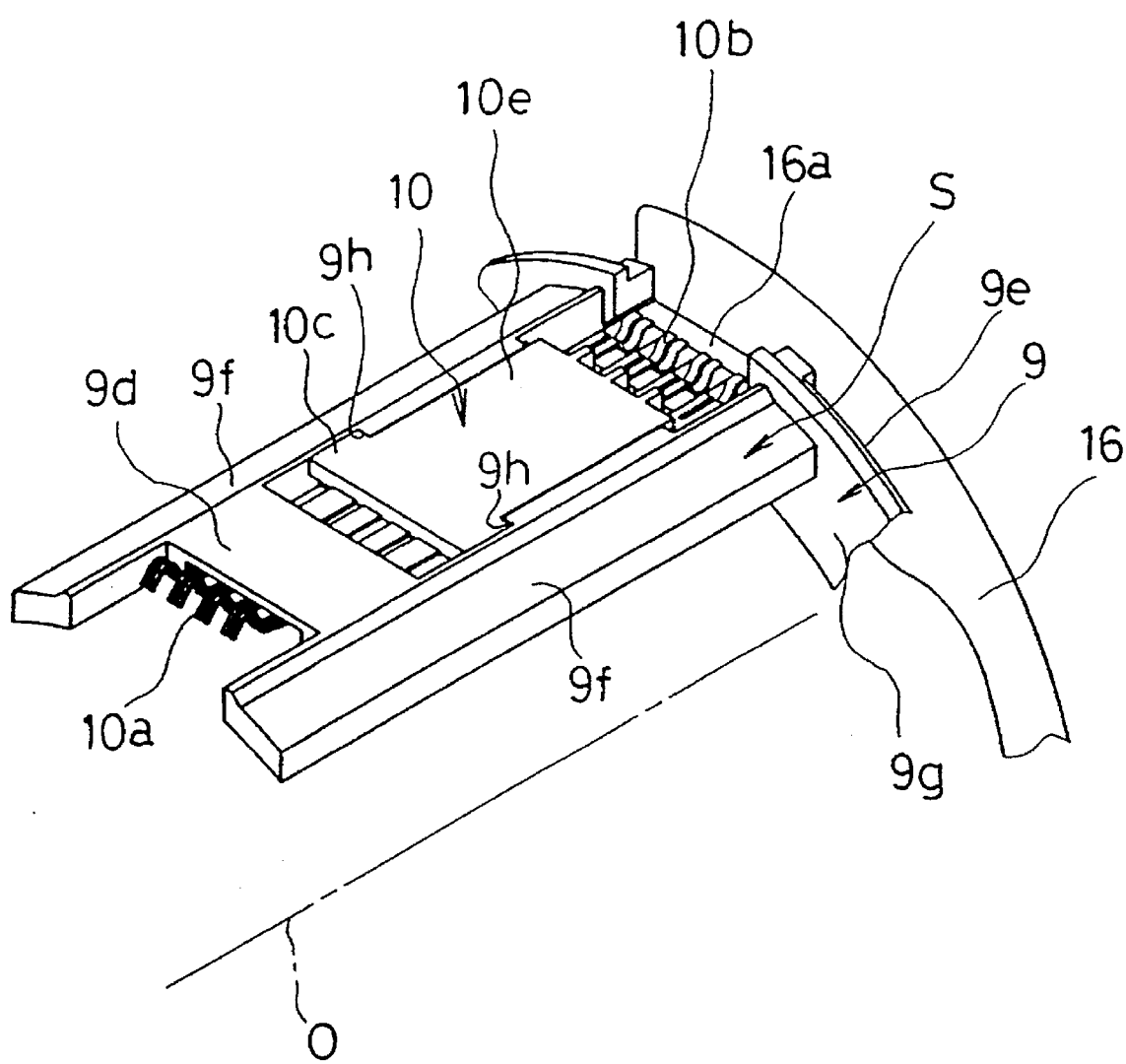
FIG. 3 is a schematic perspective view showing a state when the zoom brush is mounted to the linear guide ring.

FIGS. 2 and 3 respectively illustrate a state before, and a state after the zoom brush 10 is mounted to the linear guide ring 9.

As illustrated in FIG. 2, the linear guide ring 9 is provided with a brush supporting part S in order to support the zoom brush 10. The brush supporting part S has a pair of legs 9f projecting from a ring 9g provided on the linear guide ring 9. The legs 9f are formed parallel to each other along the optical axis. Conductive lands 9c are provided between the pair of legs 9f in the ring 9g. A control barrier 9d is provided between the pair of legs 9f, at a designated distance away from the conductive lands 9c in the optical axis direction. The conductive lands 9c are provided so that brush contacting terminals 16a of a mounted flexible printed circuit board (hereinafter referred to as an "FPC board") 16 may be contacted with, and may be conducted to, output contacting terminals 10b of the zoom brush 10. Preferably, four elastic output contacting terminals 10b are provided. The control barrier 9d is formed so that a front part (the left side as viewed in FIG. 4) of an inner periphery (the bottom surface) is slightly inclined upwardly.

The brush supporting part S has a rectangular space A, surrounded by the pair of legs 9f, the control barrier 9d and the conductive lands 9c, so that a brush holder 10e may be fitted in a prearranged mounting position therein. Each of the pair of legs 9f have on both sides 9k, which face oppositely to the rectangular space A, upward contacting stages 9a, the tops of which are cut away to form steps, and at a position closer to the conductive lands 9c than that of the upward contacting stages 9a, downward contacting stages 9b, the bottoms of which are cut away to form steps.

The upward contacting stages 9a control a downward movement of the brush holder 10e by being in slidable contact with a pair of contacting projections 10c of the brush holder 10e, and at the same time designate the prearranged mounting position of the brush holder 10e (as illustrated in FIG. 3) in a manner such that a slidable rearwards movement of the brush holder 10e in the optical axis direction, namely towards the right in FIG. 1, is controlled (in other words, the movement is prevented) by the contacting projections 10c contacting projected faces 9h of the upward contacting stages 9a.

The downward contacting stages 9b have slidable contacting faces 9i, which are in slidable contact with front movement control projections 10d during the mounting of the brush holder 10e. The slidable contacting faces 9i are formed parallel to the optical axis of the photographing optical system. The downward contacting stages 9b also have control end faces 9j, formed substantially perpendicular to the contacting faces 9i, which control the slidable position (in other words, prevent movement) of the brush holder 10e in a forwards direction in the optical axis, namely towards the left in FIG. 1, in a manner such that when the brush holder 10e is in the prearranged mounting position, the control end faces 9j permit an upward movement of the control projections 10d due to a contacting reaction force of the elastic output contacting terminals 10b, i.e., when the brush holder 10e is fitted in the prearranged mounting position, the elastic output contacting terminals 10b return to their normal state, after being slightly deformed during mounting. It should be noted that sides 9k of the pair of legs 9f and slidable contacting faces 9i constitute slide guides. During mounting of the brush holder 10e, the slide guides are in slidable contact with the brush holder 10e.

It should also be noted that the brush holder 10e of the zoom brush 10, is substantially rectangular and made of synthetic resin material. As illustrated in FIGS. 2 and 3, the brush holder 10e is formed so that the width thereof in a direction perpendicular to the optical axis O is shorter than the distance between the pair of legs 9f, and that the length of the brush holder 10e in the optical axis direction is such as to enable a little movement along the optical axis direction in the rectangular space A. In order to prevent a detachment of the zoom brush 10, the brush holder 10e is provided with the pair of contacting projections 10c which contact the pair of contacting stages 9a. The pair of front movement control projections 10d are provided to prevent movement of the zoom brush 10 in a forward direction in the optical axis by contacting with the pair of downward contacting stages 9b.

The zoom brush 10 has preferably four elastic input contacting terminals 10a, corresponding to the conductive pattern of the zoom code plate 8. Preferably, the four elastic output contacting terminals 10b are in contact with the brush contacting terminals 16a of the flexible printed circuit (FPC) board 16, which is positioned on the conductive lands 9c. The input contacting terminals 10a and the output contacting terminals 10b project respectively in forward and rearward directions of the brush holder 10e. When the contacting projections 10c are contacted with the contacting stages 9a and the front movement control projections 10d are contacted with the control end faces 9j of the downward contacting stages 9b, the input contacting terminals 10a and the output contacting terminals 10b are elastically contacted with the inner periphery of the control barrier 9d and the top of the conductive lands 9c (brush contacting terminals 16a), respectively, In the supporting construction mentioned above, the zoom brush 10 has such an elastic force (reaction force) that the contacting projections 10c press downwardly upon the contacting stages 9a, the output contacting terminals 10b press downwardly upon the brush contacting terminals 16a, and the input contacting terminals 10a press upwardly against the control barrier 9d. If the front movement control projections 10d, which contact the control end faces 9j, are considered to act as fulcrums, forces are applied to the output contacting terminals 10b and a good conduction is maintained to the brush contacting terminals 16a, due to the force applied to the terminals 10b. The output contacting terminals 10b also transfer the contacting reaction force with the brush contacting terminals 16a, so that the brush holder 10e is biased (pressed) against the control end faces (stoppers) 9j of the downward contacting stages 9b. In addition, since the input contacting terminals 10a of the zoom brush 10 are in elastic contact with the inner periphery of the control barrier 9d, the reaction force thereof functions as a force to maintain (press) the brush holder 10e on (against) the upward contacting stages 9a and the contacting projected faces 9h (stoppers).

As described above, the zoom brush 10, when supported by the brush supporting part S, is biased by the reaction forces as noted above, thus preventing detachment from the stoppers based on the forces created between the input contacting terminals 10a and the output contacting terminals 10b, and therefore it is supported surely and stably. This is especially so when the zoom brush 10 is mounted in a proper position to the front lens group ring 7 and when the input contacting terminals 10a are in slidable contact with the zoom code plate 8. Here, the input contacting terminals 10a are deformed even more in such a direction that reaction force against the upward contacting stages 9a is increased, and therefore the zoom brush 10 is supported much more stably by the brush supporting part S.

The function of the zoom lens barrel having the above construction will now be described.

When the driving motor drives, the rotation thereof is transmitted to the peripheral gear 11e and the cam ring 11 is then driven rotatively in the optical axis direction according to the relationship between the male multiple thread 11b and the female multiple thread 15a. At the same time, due to the relationship between the female multiple thread 11a and the male multiple thread 7a, and also by the AF/AE unit 5 and the linear guide function of the linear guide ring 9, the front lens group ring 7 (i.e., the front lens group L1) moves linearly in the optical axis direction. When the cam ring 11 rotates, due to the relationship between the inner cam groove 11c, in the inner periphery thereof, and a cam pin (not shown) provided in the rear lens group frame 4, and by the rear lens group frame 4 and linear guide function of the linear guide ring 9, the rear lens group frame 4 (i.e., the rear lens group L2) moves linearly in the optical axis direction, and therefore zooming is performed.

Figure 4:
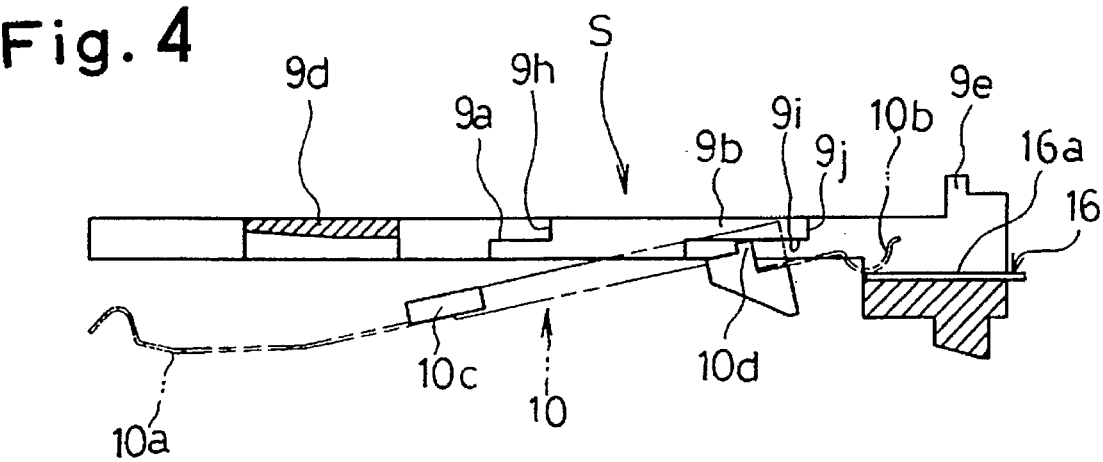
FIG. 4 is a schematic side elevational view illustrating an initial stage of mounting the zoom brush.
Figure 5:
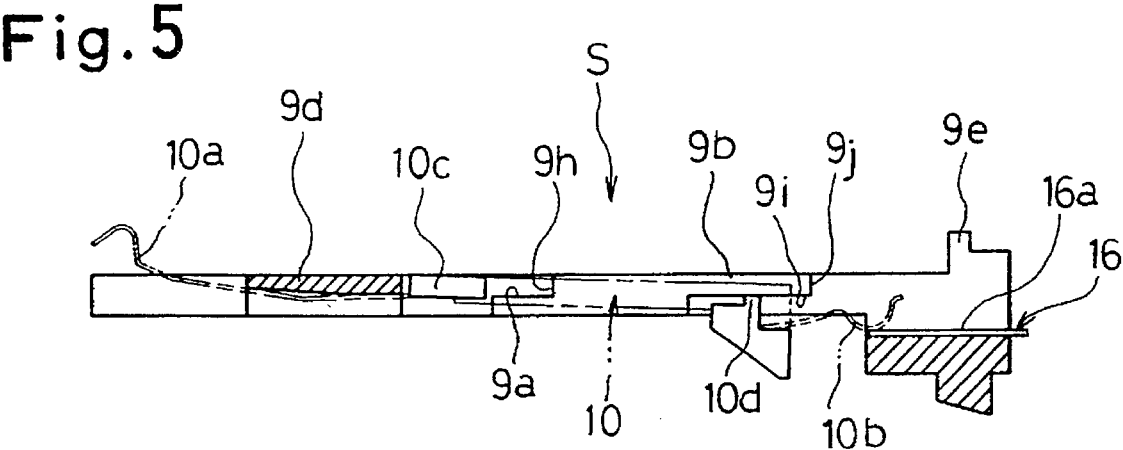
FIG. 5 is a schematic side elevational view illustrating a middle stage of mounting the zoom brush.
Figure 6:
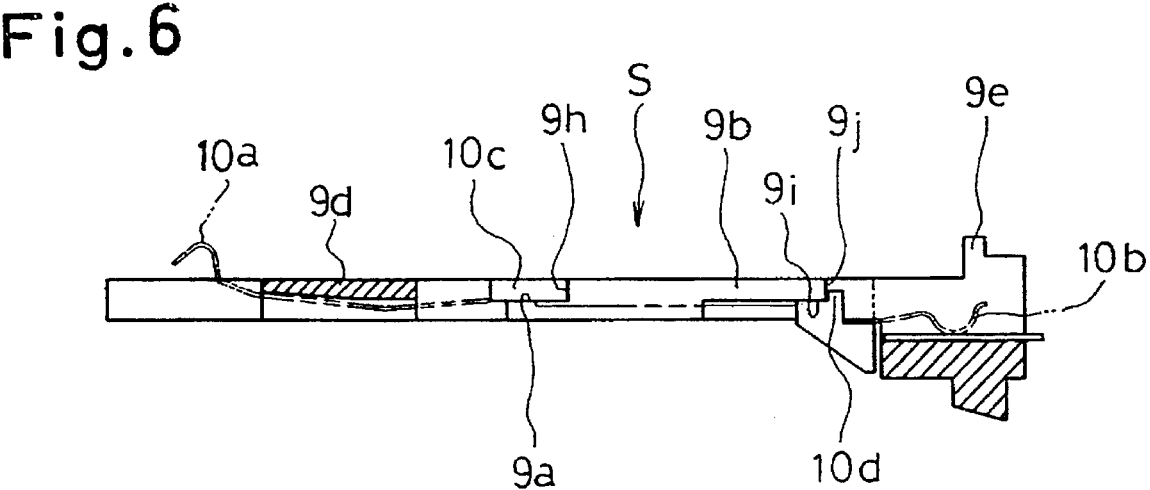
FIG. 6 is a schematic side elevational view illustrating a completed mounting of the zoom brush.

During assembly, when the zoom brush 10 is mounted to the brush supporting part S, by firstly positioning the longitudinal sides of the brush holder 10 along both sides 9k of the pair of legs 9f, so the top end of the front movement control projections 10d are contacted with the bottom face of the downward contacting stages 9b, i.e., slidable contacting faces 9i, and the output contacting terminals 10b are placed on the brush contacting terminals 16a, which are placed on the conductive lands 9c (as illustrated in FIG. 4). In such a state, when the front end of the zoom brush 10 (i.e., the left side in FIG. 4) is rotated clockwise with the top end of the front movement control projections acting as the center of rotation, the zoom brush 10 rotates by bending the input contacting terminals 10a and the output contacting terminals 10b against the elastic forces thereof until the input contacting terminals 10a contact the inner periphery of the control barrier 9d (as illustrated in FIG. 5). In this state the contacting projections 10c are capable of contacting the contacting stages 9a.

In such a state, the zoom brush 10 is moved rearwards in the optical axis direction, namely to the right in FIG. 5, i.e., the top ends of the front movement control projections 10d are in slidable contact along the contacting faces 9i. When the top ends of the front movement control projections 10d detach from the slidable contacting faces 9i, the front movement control projections 10d move upwardly and come into contact with the control end faces 9j of the contacting stages 9b, due to the elastic force (in other words, reaction force) of the output contacting terminals 10b. Simultaneously, the contacting projections 10c project into the contacting projected faces 9h of the upward contacting stages 9a. Therefore, the zoom brush 10 is prevented from moving in the optical axis direction because of contacting relationship between the front movement control projections 10d and the downward contacting stages 9b, and the contacting relationship between the contacting projections 10c and the projected faces 9h. Also, the zoom brush 10 is prevented from being detached from the brush supporting part S because of the contacting relationship between the contacting projections 10c and the contacting stages 9a. The input contacting terminals 10a are in elastic contact with the inner periphery of the control barrier 9d, and the output contacting terminals 10b are in elastic contact (or are merely contacted) with the brush contacting terminals 16a of the flexible printed circuit (FPC board 16.

As described above, by sliding the input contacting terminals 10a in a direction towards the conductive lands 9c, and by sliding the brush holder 10e rearwardly in the rectangular space A, the input contacting terminals 10a are capable of being positioned at a position corresponding to the zoom code plate 8, and the output contacting terminals 10b are capable of being set easily and surely in the prearranged mounting position to be contacted with the FPC board 16. Therefore, as compared with the conventional supporting method in which a zoom brush is fixed by screws, adhesives or the like, assembling or detaching time is shortened, and production efficiency is improved.

According to the present invention, the zoom bush 10, when supported by the brush supporting part S, utilizes the reaction force, which prevents detachment thereof from the stoppers. The reaction force is generated by the interaction of the input contacting terminals 10a and the output contacting terminals 10b, and therefore the zoom brush 10 is supported surely and stably by the brush supporting part S. Furthermore, when the zoom brush 10 is mounted in a proper position to the front lens group ring 7, the input contacting terminals 10a are further deformed in a direction such that the reaction force thereof against the upward contacting stages 9a is increased, thus the zoom brush 10 is supported more securely by the brush supporting part S.

Though embodiments of the present invention are described in relation to a zoom lens barrel of a still camera, the present invention may also be adopted to any other zoom lens barrel, like that of a movie or video camera.

Of course, it is clear that the present invention is still not limited to the embodiments described above, nor those illustrated in the drawings, and the invention can be modified without departing from the spirit and scope of the claimed invention.

What is claimed is:

1. A zoom lens barrel comprising:

an outer ring;

an inner ring located inside said outer ring, said inner ring moving relative to said outer ring during zooming;

a conductive elastic zoom brush holder having zoom brushes at both ends of said brush holder, said brush holder being supported by one of said inner ring and said outer ring;

a zoom code plate slidably contacting said zoom brushes at one end of said brush holder, said zoom code plate being supported by the other of said inner ring and said outer ring; and brush contacting terminals disposed on a flexible printed circuit board, said brush contacting terminals being in contact with said zoom brushes at another end of said brush holder, wherein a contact reaction force, created between said zoom brushes of said another end of said brush holder and said brush contacting terminals, functions as a force to bias said brush holder against one of said inner ring and said outer ring.

2. The zoom lens barrel according to claim 1, further comprising a slide guide and a stopper, said slide guide and said stopper being provided on said one of said outer ring and said inner ring which supports said brush holder, wherein during an assembly operation said brush holder is slid along said slide guide until reaching said stopper, said stopper defining a sliding terminal position of said brush holder.

3. The zoom lens barrel according to claim 2, wherein when said brush holder is in contact with said stopper, and a reaction force, caused between said zoom brushes of said one end of said zoom brush holder and said zoom code plate, functions as a force to bias said brush holder against said stopper.

4. The zoom lens barrel according to claim 3, wherein said brush holder is supported by said inner ring, and said zoom code plate is supported by said outer ring.

5. The zoom lens barrel according to claim 4, wherein said inner ring defines a rectangular space into which said brush holder is provided in a prearranged mounting position, wherein longitudinal sides of said rectangular space are defined by a pair of legs formed parallel to said direction of movement of said brush holder.

6. The zoom lens barrel according to claim 5, wherein said slide guide and said stopper are provided in each of said pair of legs.

7. The zoom lens barrel according to claim 5, further comprising a control barrier provided between said pair of legs, said control barrier provided at one end of said pair of legs, and said brush contacting terminals provided at the other end of said pair of legs, wherein a part of said zoom brushes at one end of said brush holder contacts a bottom of said control barrier when said brush holder is in said prearranged mounting position.

8. The zoom lens barrel according to claim 7, wherein when said part of said zoom brushes at one end of said brush holder contacts said bottom of said control barrier, a reaction force is created, said reaction force functioning as a force to bias said brush holder against said stopper.

9. The zoom lens barrel according to claim 2, wherein said slide guide comprises a front slide guide and a rear slide guide.

10. The zoom lens barrel according to claim 2, wherein said stopper comprises a front stopper and a rear stopper.

11. The zoom lens barrel according to claim 10, wherein said front slide guide and said front stopper prevent a downward movement of said brush holder to relative to said zoom lens barrel.

12. The zoom lens barrel according to claim 10, wherein said rear slide guide and said rear stopper prevent an upward movement of said brush holder relative to said zoom lens barrel.

13. The zoom lens barrel according to claim 12, wherein when said brush holder is in contact with said rear stopper, a reaction force, created between said zoom brushes of said one end of said zoom brush holder and said zoom code plate, functions as a force to bias said brush holder against said rear stopper.

14. The zoom lens barrel according to claim 12, wherein during said assembly operation said brush holder is slid along said rear slide guide in a direction towards said brush contacting terminals until a prearranged mounting position is reached, and upon reaching said prearranged mounting position said brush holder contacts said rear stopper.

15. The zoom lens barrel according to claim 12, wherein said brush holder further comprises a pair of contacting portions, said contacting portions contacting said front slide guide during said assembly operation.

16. The zoom lens barrel according to claim 10, wherein said rear slide guide is formed parallel to an optical axis of said zoom lens barrel, and said rear stopper is formed perpendicular to said rear slide guide.

17. The zoom lens barrel according to claim 1, wherein said flexible printed circuit board is provided on said one of said outer ring and said inner ring which supports said brush holder.

18. A zoom lens barrel comprising:

an outer ring;

an inner ring located inside said outer ring, said inner ring moving relative to said outer ring during zooming;

a conductive elastic zoom brush holder having zoom brushes at both ends of said brush holder, said brush holder being supported by one of said inner ring and said outer ring;

a zoom code plate slidably contacting said zoom brushes at one end of said brush holder, said zoom code plate being supported by the other of said inner ring and said outer ring;

a flexible printed circuit board electrically connected to said zoom brushes, said flexible printed circuit board being provided on said one of said outer ring and said inner ring which supports said brush holder; and brush contacting terminals disposed on said flexible printed circuit board, said brush contacting terminals being in contact with zoom brushes of the other end of said brush holder.

* * * * *